United States Patent [19]
Burke

[11] 3,993,790
[45] Nov. 23, 1976

[54] PROCESS OF MAKING COLLAGEN CASINGS USING MIXED ACIDS

[75] Inventor: Noel I. Burke, Danville, Ill.

[73] Assignee: Tee-Pak Inc., Chicago, Ill.

[22] Filed: Mar. 22, 1976

[21] Appl. No.: 668,876

[52] U.S. Cl. ............................... 426/277; 426/140
[51] Int. Cl.² ....................................... A22C 13/00
[58] Field of Search .................... 426/140, 105, 277

[56] References Cited
UNITED STATES PATENTS

| | | | |
|---|---|---|---|
| 3,425,846 | 2/1969 | Talty | 426/277 |
| 3,821,439 | 6/1974 | Cohly | 426/140 X |
| 3,860,728 | 1/1975 | Tanner et al. | 426/140 X |
| 3,894,158 | 7/1975 | Miller | 426/140 X |
| 3,930,036 | 12/1975 | Burke | 426/140 |
| 3,932,677 | 1/1976 | Burke | 426/277 |

*Primary Examiner*—Joseph M. Golian
*Attorney, Agent, or Firm*—Paul Shapiro; Joseph E. Kerwin; William A. Dittmann

[57] ABSTRACT

Aqueous dispersions of swollen hide collagen suitable for extrusion into tubular food casings are prepared by dispersing finely comminuted collagen particles at a concentration of 2–8% by weight in water. Swelling of the collagen particles is effected by adjusting the pH of the dispersion to between 2.5 to 3.7 with a mixture of a strong acid having a dissociation constant in water at 25° C of greater than $1 \times 10^{-3}$, e.g., sulfuric acid, and a weak acid having a dissociation constant in water at 25° C between $1 \times 10^{-6}$ to $1 \times 10^{-3}$, e.g., lactic acid.

4 Claims, No Drawings

PROCESS OF MAKING COLLAGEN CASINGS USING MIXED ACIDS

BACKGROUND OF THE INVENTION

1. Field of the Invention

This invention relates to the manufacture of edible food casings derived from animal hide collagen and more particularly to an improved method of preparing extrudable collagen compositions.

2. The Prior Art

Collagen casings have been widely accepted as edible food casings for pork sausages. In the preparation of edible collagen casings, hide collagen derived from animal hides is converted into a finely divided fibrillar form and extruded in tubular form to form the casing. There are basically two processes for forming the casings.

In the first of these processes, referred to in the art as the "slurry" process, collagen derived from finely comminuted animal hides is suspended in an aqueous bath at a low solids content, i.e., 2.0–6% by weight and about 1 to 4% by weight of a weak organic acid having a dissociation constant in the order of about $1 \times 10^{-6}$ to about $1 \times 10^{-3}$ in water at 25° C such as lactic acid, is added to the bath to adjust the pH of the bath to a range of about 2.5 to 3.7 to swell the collagen and form collagen fibrils. The dilute slurry of swollen collagen fibrils is extruded as a tubular mass into a concentrated sodium sulfate or aluminum sulfate coagulating bath which dehydrates the collagen slurry and forms coherent tubing. The tubing is then passed through a tanning bath, e.g. a bath containing a hardening agent such as alum to form a handlable casing. The hardened tubing is then washed to remove entrained salts and inflated and dried to form the desired casing product. The slurry process is completely disclosed in U.S. Pat. Nos. 3,123,482, 3,194,865 and 3,413,129.

The second of the basic processes for forming collagen casings is referred to in the art as the "dough" process. In the dough process as disclosed in U.S. Pat. No. 2,114,220, hide fragments are swelled with a dilute (1–5%) aqueous solution of an alkaline substance such as $Ca(OH)_2$ or an acid substance such as HCl and the swelled hide fragments are comminuted into a collodial paste containing 10–20% collagen solids. The paste adjusted to a pH of 2.5–3.5 is extruded under high pressure (350–450 atms) directly into tubing which is then dried to form the desired collagen casing product.

In the slurry process the use of weak acids such as lactic acid is an appreciable cost factor in the manufacture of the casing and a portion of the lactic acid from the extruded slurry eventually finds its way into the process effluent which must be removed therefrom as its organic nature creates a pollution problem. It would be beneficial in terms of cost and in the alleviation of pollution problems that the amount of lactic acid used in the slurry process be reduced.

SUMMARY OF THE INVENTION

In accordance with the present invention, tubular collagen casings are produced by extruding a collagen slurry comprised of 2–8% by weight swelled comminuted collagen dispersed in an aqueous bath, the pH of the bath being adjusted to a range of 2.5–3.7 with a mixture of a weak, non-toxic organic acid having a dissociation constant in water of 25° C of about $1 \times 10^{-6}$ to $1 \times 10^{-3}$ and a strong acid having a dissociation constant in water at 25° C greater than $1 \times 10^{-3}$.

The use of a strong acid for swelling collagen particles materially reduces the amount of weak acid required in the preparation of the extrudable collagen slurry.

Further, it has been found that the freshly coagulated casings prepared in accordance with the present invention have a higher collagen solids content and therefore require a reduced amount of time to effect drying of the casing which provides the additional cost advantage of lowering the energy expense required to effect drying.

PREFERRED EMBODIMENTS

Collagen which is suitable for the preparation of edible casings is usually obtained from bovine hides. Collagen is formed of a large number of fibers which in turn consist of a much greater number of fibrils of sub-microscopic size. Collagen fibrils have a diameter of the order of 10–50 angstroms and lengths ranging from several million angstroms. Recent patents describing the production of edible collagen casings by the slurry process have emphasized the necessity of using collagen source materials which have not been subjected to a liming treatment for the reason that the liming treatment allegedly prevents the bursting of the collagen fibers to release the fibrils which is necessary for the formation of fibrillar films. However, it has also been found that edible casings can be made using the slurry process from collagen sources which have been subjected to liming.

Thus in practicing the process of the present invention, edible collagen casings can be prepared from collagen derived from unlimed or limed hides. In preparing edible collagen casings from unlimed hides, hide splits are cut into small pieces and passed through a meat grinder until reduced to a very small size. The ground collagen then is swollen in a dilute mixed acid solution of weak and strong acids to produce a slurry having a collagen content in the range from about 2–8% by weight.

If the hide splits are derived from limed hides, the hides splits prior to being ground and swollen are washed to remove the lime in the hides or the split is neutralized by treatment with a non-toxic acid such as lactic acid to form water-soluble calcium salts. The neutralized hide then is washed with water to remove most of the by-product salts. Slurries of the washed hides are then prepared following the same procedure as used for unlimed hides.

In preparing the extrudable collagen slurry, the pH of the slurry is adjusted to a pH between about 2.5 to 3.7 with the mixture of weak and strong acids. Generally the concentration of the weak acid, i.e., an acid having a dissociation content between $1 \times 10^{-6}$ to $1 \times 10^{-3}$ in the slurry ranges from about 0.1 to 1.5% by weight of the slurry and preferably in the range of 0.25 to 1.00% by weight. If amounts of weak acid outside this range are employed, the physical properties of the final casing product will be deleteriously affected.

The concentration of the strong acid, i.e., an acid having a dissociation constant greater than $10^{-3}$, in the slurry ranges from about 0.12 to about 0.24% by weight and preferably about 0.15 to 0.23% by weight. Again, as in the case of the weak acid, if the concentration of the strong acid incorporated in the collagen slurry is outside the ranges just prescribed, the physical properties of the final casing product will be deleteriously affected. Generally, the weight ratio of weak acid to strong acid used to affect collagen swelling will range from 5:1 to 0.9:1. Further, as a rule of thumb, as the proportion of the weak acid is reduced toward the lower amount in the operative range for the weak acid, e.g., 0.1% by weight, then the proportion of strong acid incorporated in the slurry is increased toward the upper end of the operative range for the strong acid, i.e., toward 0.25% by weight. Likewise, where the proportion of strong acid is reduced toward the lower amount, e.g., 0.12% by weight, the proportion of weak acid incorporated in the slurry is increased toward the upper end of the operative range for the weak acid, e.g., 1.5% by weight.

Weak acids which may be used in the practice of the present invention are those having dissociation constants as indicated above which acids include the hydroxy organic acids, e.g., lactic, tartaric and citric acid. Others acids include glutaric, malonic, acetic and fumaric acid. Lactic acid having a dissociation constant in water of $1.38 \times 10^{-4}$ at 25° C is preferred in the practice of the present invention.

Strong acids which may be used in the practice of the present invention are those having a dissociation constant as indicated above which acids include hydrochloric acid, phosphoric acid and sulfuric acid. Sulfuric acid is preferred as the sulfate ion of the acid shares a commonality with the sodium and ammonium sulfate salts presently used in conventional coagulation baths which avoids the necessity of changing the composition of the coagulation bath and the ancilliary equipment used to process and recover the salt for reuse in the conventional manufacturing method.

In preparing extrudable collagen slurries in accordance with the present invention, collagen derived from ground particles of unlimed hide or neutralized limed hide are immersed in water containing the proper admixture of strong and weak acids in sufficient concentration to maintain the pH of the slurry between 2.5 and 3.7, and preferably between 2.8 and 3.3. The concentration of collagen dispersed in the mixed acid solution ranges from about 2 to about 8% by weight.

When less than about 2% collagen is contained in the slurry, there often is insufficient collagen to form a coherent film after the slurry has been extruded through the die. Also, the resultant film often has pinholes because of the small proportion of collagen being present. On the other hand, when the slurry contains more than about 8% collagen, the slurry is difficult if not impossible to extrude.

The collagen particles, after being added to the acid solution, are permitted to remain in contact with mixed acid solution for a period of 20 to 200 hours and preferably 60 to 150 hours to effect substantial swelling of the dispersed collagen particles.

After the collagen particles are substantially swelled, the slurry is then ready for extrusion into tubular sausage casing. The remaining steps in the process of forming a tubular casing then are the same as those described in the prior art processes.

Thus, to prepare tubular casings, the swollen collagen slurry obtained as described above from unlimed collagen or limed collagen is extruded through an annular die. Preferably, the collagen slurry is extruded through a die having counter-rotating inner or outer parts or both, such die being well known in the collagen casing art and is more fully described in U.S. Pat. No. 2,046,541.

The casing is extruded into a coagulating bath generally consisting of a concentrated, preferably saturated solution, of sodium sulfate or ammonium sulfate adjusted to a pH of between 7 to 9 with an alkaline agent such as NaOH or NH$_4$OH for neutralization of the acid in the slurry, although any reagent capable of coagulating the extruded collagen slurry to form a coherent film which is non-toxic can be used for practicing the invention. Ammonium sulfate coagulating baths are the most common and are preferred.

From the coagulation bath, the casing is passed into a first tanning bath which comprises a solution containing from about 5–20% of aluminum sulfate Al$_2$(SO$_4$)-3–18 H$_2$O, 3–7% sodium citrate (or an equivalent amount of citric acid) and the sodium citrate or citric acid forms a complex with the aluminum sulfate and the sodium hydroxide neutralizes a portion of the aluminum-citrate complex to render the same about ⅓–⅔ basic. A suitable tanning bath may similarly be made from ferric salts by formation of a citrate complex and partially neutralizing the complex with sodium carbonate or other weak alkali to convert the complex to a chelated form. Other tanning agents known in the art of collagen casing manufacture may be used.

The casing after removal from the tanning bath is subsequently washed and plasticized in a bath containing both a plasticizer such as glycerine and a softening agent such as an acetylated monoglyceride following conventional practice, e.g., as described in U.S. Pat. No. 3,620,775. The casing which is prepared in this manner is then passed through a dryer and dried.

Drying normally is effected by inflating the collagen tube with air or other gas and passing through a dryer. The casing may be shirred directly from the dryer but this is not generally done inasmuch as the shirring machines operate at a higher speed than the extrusion rate in the process. Therefore, the casing is preferably stored on reels and fed separately to shirring machines of the type generally used in the shirring of cellulosic sausage casings. Typical, shirring machines are shown in U.S. Pat. No. 2,722,714, 2,722,715, 3,723,201 and 3,122,517.

The following examples are provided to illustrate preferred embodiments of the invention and are not intended to limit the scope thereof. All percentages are expressed as weight percentages.

EXAMPLE 1

In a series of runs, an aqueous slurry adjusted to a pH of 2.8 with varying concentrations of sulfuric acid and lactic acid and containing 5.1% by weight collagen derived from limed hide splits was pumped under pressure through an extrusion die into an aqueous coagulation bath containing sufficient (NH$_4$)$_2$SO$_4$ to saturate the bath. After the casings were coagulated, the wet casings were removed from the ammonium sulfate bath and hardened by passing the casings into a tanning bath containing citrate complexed alum. After contact with the tanning bath, the hardened casings were removed and plasticized by passing them through an aqueous solution of 3% glycerin for about 3 minutes. Thereafter, the plasticized casing was inflated and dried at 210°–211° F. The dried casings were shirred and shipped to a meat packer for stuffing.

The properties of the wet casing are recorded in the Table below. The strength of the wet, freshly coagulated casing was determined using a Scott tester. In measuring casing strength using this tester, the greater the weight (in grams) required to tear the casing apart, the stronger the casing.

Stuffing of the dried and shirred casings was observed at a meat packer and the percent of links in a 40 foot strand of casing which encountered linker breakage during stuffing (i.e., the percent of casing which split at the shoulder portion of the meat filled casing during twisting to prepare sausage links) was observed and recorded. The % linker breakage of stuffed and linked collagen casings made in accordance with the procedure of Example 1 are recorded in the Table below.

For purposes of comparison, the runs of Example I were repeated with the exception that the pH of the collagen slurry was adjusted to 2.8 either using mixtures of acids outside the scope of the present invention or the acids alone. The results of these comparative runs are also recorded in the Table and are designated by the symbol C.

TABLE

| Run No. | Acid Concentration in Collagen Slurry | | Wet Casing Strength (g) | Solids In Wet Casing (%) | Drying Temp. (° F.) | Linker Breakage (%) |
|---|---|---|---|---|---|---|
| | Lactic Acid (%) | $H_2SO_4$ (%) | | | | |
| 1. | 0.83 | 0.165 | 810 | 11.1 | 210° | 1.5 |
| 2. | 0.40 | 0.200 | 800 | 11.1 | 211° | 2.6 |
| 3. | 0.20 | 0.220 | 821 | 10.9 | 210° | 9.8 |
| $C_1$ | 1.80 | 0.100 | 620 | 9.1 | 320° | 90.0+ |
| $C_2$ | 2.40 | 0.0 | 650 | 9.1 | 320° | 4.1 |
| $C_3$ | 0 | 0.250 | Slurry could not be extruded. | | | |

By referring to the Table, it is immediately apparent that wet collagen casings extruded from slurries in which the pH was adjusted with a mixture of strong and weak acids in accordance with the practice of the present invention (Run Nos. 1–3) have substantially improved physical properties and higher solids content when compared to wet collagen casings extruded from collagen slurries in which the pH was adjusted with acid concentrations outside the scope of the present invention (Run Nos. $C_1$–$C_3$).

EXAMPLE 2

The procedure of Example 1 repeated with the exception that the pH of the slurry was adjusted to 2.8 with 0.9% lactic acid and 0.45% concentrated HCl. The wet collagen casing had a wet strength of 580 grams and a linker breakage on stuffing and linking of 4%.

What is claimed is:

1. A process for preparing tubular collagen food casings which comprises preparing comminuted particles of collagen, adding the collagen particles to water to prepare an aqueous dispersion containing 2 to 8 percent by weight collagen and then adjusting the pH of the aqueous dispersion to between 2.5 to 3.7 with a mixture of strong and weak acids to effect substantial swelling of the dispersed collagen, the strong acid having a disassociation constant in water at 25° C of more than $1 \times 10^{-3}$ and the weak acid having disassociation constant between $1 \times 10^{-6}$ and $1 \times 10^{-3}$ in water at 25° C and wherein the acid mixture contains 0.12 to 0.24% by weight of the strong acid and 0.1 to 1.5% by weight of the weak acid, and extruding the aqueous dispersion into a coagulation bath to form the casing.

2. The process of claim 1 wherein the strong acid is sulfuric acid.

3. The process of claim 1 wherein the strong acid is hydrochloric acid.

4. The process of claim 1 wherein the weak acid is lactic acid.

* * * * *